United States Patent Office 2,883,329
Patented Apr. 21, 1959

2,883,329
PROCESS FOR PRODUCING CITRIC ACID

Paul Vergnaud and René Niquet, Melle, France, assignors to Les Usines de Melle (Societe Anonyme), Saint-Leger-les-Melle, Deux-Sevres Department, France, a corporation of France No Drawing. Application June 27, 1956
Serial No. 594,092

Claims priority, application France July 11, 1955

13 Claims. (Cl. 195—36)

This invention relates to methods for producing organic acids by submerged aerobic fermentation. More particularly, it relates to the production of the organic acids formable by fermentation of sugars at relatively low pH. In a specific aspect, it relates to the production of citric acid.

It is well known that organic acids can be produced by the aerobic fermentation of glucides, hereinafter referred to as sugars, effected by particular strains of fungi or mold.

In the production of citric acid, certain essential conditions must be met. Suitable microorganisms must be employed, and the biochemical reaction must be carried out at a relatively low pH. Also, the mold must be provided with sufficient oxygen during its growth and during the fermentation period. In addition, it is believed that limitation of the concentration of certain elements in the fermentation medium, especially phosphorous and iron cations, is necessary. Furthermore, certain elements, often referred to as "nutrient elements," are necessary in order that the mold grow properly.

The expression "nutrient elements" as used herein is to be understood as covering any and all non-toxic substances which may take part in the biochemical activity of the micro-organism. These elements include particularly assimilable nitrogen, phosphorous, magnesium and potassium, growth agents, heavy metals such as zinc, small quantities of iron, copper, vitamins, and the like which take part either in the construction of the mold mycelium, or in the positive or negative catalysis of the biochemical reactions which take place. It is well known that some of these elements, the so-called "trace elements" can act where they are present in very low concentration, e.g., far below one milligram per liter of medium.

Any fermentation process for the production of citric acid comprises two successive periods. In the first, the mycelium grows at the expense of a part of the sugar present and produces relatively little acid. In the second period, the growth continues more or less rapidly, but at the same time a greater part of the sugar is converted to acid. Should the pH be maintained in the neighborhood of 7, mainly gluconic acid will be formed. If the pH is 3–6, oxalic acid will be the predominant product.

The weight of mycelium grown depends primarily upon the content of constructive nutrient elements and the pH of the growing medium. Shu and Johnson ("Industrial and Engineering Chemistry," 1948, p. 1202) indicate that it is possible to limit growth by independently varying either the content of iron cations or assimilable phosphorous. If the weight of mycelium grown is too small, the speed of fermentation is too low. On the other hand, if the weight is too high, comparatively large amounts of sugar are used to construct it, which sugar will not be converted to citric acid. Moreover, too great a weight of mycelium in a submerged fermentation renders the medium viscous and, accordingly, access of oxygen to the micro-organism is impeded. When operating with such a viscous medium, thorough agitation is absolutely necessary, and the agitating means are necessarily of heavier construction and power consumption is greater than when operating in a relatively non-viscous medium. In Shu and Johnson's paper, the indicated weight of mycelium on a dry base was generally between about 5 and 25 grams per liter of medium.

The content of assimilable phosphorous, reckoned as monopotassium phosphate, is generally in the range 0.02–2.5 grams per liter of medium, and the content of iron cations is generally below 4 milligrams, and preferably below 2 milligrams per liter.

According to Shu and Johnson, for a given growing medium rich in constructive nutrient elements, the weight of mycelium developed is from 18 grams per liter for an initial pH of 4.9 to 7 grams per liter for an initial pH of 1.7.

It is proposed in U.S. Patent No. 2,353,771 that the growth stage be carried out in the first medium containing assimilable phosphorous, after which the mycelium is separated and washed and then introduced into a second or fermentation medium which does not contain assimilable phosphorous. The patent states that the same medium may be used for carrying out the two stages, provided that the initial content of phosphorous is low enough to be completely assimilated during the growth stage.

Various other patents recommend this last method of operation, and in such cases, the content of monopotassium phosphate in the medium is usually below 0.150 gram per liter. The media are generally previously acidified, but a culture medium whose initial pH is low is suitable only where its content of nutrient elements is high.

Though the cited patent, 2,353,771, discloses only the use of relatively pure sugar materials, such as pure sugars or the so-called "purified molasses" (which, in the art of fermentation, means molasses having been treated by lime, to remove phosphorous, and by ion-exchange materials, to remove most of the mineral substances present in crude molasses), the yields obtained are still low (average total yield: 60–62%). Furthermore, the problem of economically fermenting crude, impure sugar materials is not solved thereby.

As a general proposition, relatively high proportions of sugar should be consumed to construct the mycelium, and the remaining sugar is converted to citric acid only after such construction. For processes involving two successive stages with intermediate separation of the mycelium, a medium relatively poor in sugar may be used, becaus the mycelium is formed in the separate first stage. In these processes, however, the total yield of citric acid is low. Furthermore, such processes are delicate and difficult to carry out since the mycelium should be separated and washed under aseptic conditions. When growth and fermentation are carried out in a single stage, it is necessary to use a medium rich in sugar to obtain satisfactory yields of citric acid.

The required conditions of the above-mentioned processes can be easily realized with media containing purified commercial sugar. However, this is not true when the medium employed contains appreciable quantities of considerably cheaper crude molasses. This is because the content of nutrient elements in molasses is substantially higher than the above-indicated maximum. Furthermore, the buffer action of molasses solutions is always relatively strong. Thus, in accordance with the above explanations with respect to the sugar richness of the solutions and the influence of pH, a pH suitable for formation of citric acid can be attained only after a high consumption of sugar, which is either consumed to construct the mycelium or converted to acids other than citric acid.

It has been proposed that the molasses be purified previously, as by passing a solution of the same over or through ion-exchange materials. However, such a treatment is delicate and expensive to carry out. It has also been suggested that the molasses solution be treated with calcium oxide to precipitate the phosphatic materials which it contains. As thus purified, molasses is being used for the commercial production of citric acid.

Apparently, it is at least necessary that the heavy metallic elements, particularly iron cations, in the molasses be brought to the desired level by previously treating the molasses solution with a soluble ferrocyanide or other precipitating or complex-forming agent. The precipitate formed may be separated by filtration before the fermentation, although this is not absolutely necessary. Following precipitation it may be necessary to restore the content of certain constructive elements, such as zinc cations. This treatment renders molasses more suitable for citric fermentation, but does not always avoid difficulties encountered with the wide variety of molasses commercially available. The difficulty of obtaining satisfactory results with certain molasses is noted by Martins and Waters ("Industrial and Engineering Chemistry," 1952, p. 2229.) Starting with molasses from the same geographical origin but from different years, the authors, in carrying out the same previous ferrocyanide treatment and the same fermentation process, obtained citric acid yields varying from 9.9 to 70.7% of the starting sugar.

Accordingly, it is an object of the present invention to provide a more efficient method of producing organic acids and particularly citric acid from relatively cheap sugar bearing starting material by aerobic fermentation in which consistently high yields of acids are obtained. Another object is to provide a process for producing these acids from molasses or molasses-containing sugar solutions in high yield with a minimum consumption of sugar during mycelium growth, and a minimum growth during acid fermentation.

In accordance with the present invention, we have found that the difficulties previously encountered in citric acid fermentations can be greatly minimized and the conversion of sugar employed to citric acid can be greatly increased by carrying out the process in two stages. In the first stage, mycelium is grown in the presence of nutrient elements in a medium relatively poor in sugar, having an initial pH substantially greater than 3, usually between about 4 and 6.5, and having a buffer index below 6. Growth of the mycelium is continued in this sugar-poor medium until the pH decreases to approximately 3 or below 3. During this growth stage, a very small quantity of citric acid is formed. In fact, it may be said that there is substantially no formation of citric acid during mycelium growth. When the pH has fallen to 3 or below, a sugar solution, and preferably a molasses-containing solution, substantially richer in sugar than the growth medium, is added batchwise or continuously thereto at a rate such that the pH of the resulting mixture remains at or below 3. This addition of sugar-rich solution comprises the second stage of the process. During addition, fermentation to citric acid takes place, and after the addition has been completed, fermentation is allowed to continue until equilibrium has been reached.

Citric acid may then be recovered from the fermented liquid by any conventional method. For example, the fermented liquid may be treated with lime which precipitates the citric acid as calcium citrate, then the calcium citrate is decomposed by means of a strong mineral acid, for example sulfuric acid, to liberate the citric acid.

The contents of the various nutrient elements may easily be adjusted during the first or growth period by varying independently the content of sugar or molasses in the growing medium and that of nutrient elements, which may be added if required.

It is not necessary that the molasses used be previously purified as by conventional methods such as treatment with lime and with ion-exchange materials. However, if the content of heavy metals, particularly iron cations, in the molasses is too high, it should be reduced, for example through precipitation by means of a soluble ferrocyanide employed in small amount.

One of the essential characteristics of the present invention is growing the mycelium in a medium having a low buffer index. Buffer index as employed herein is defined as the number of grams of pure hydrogen chloride which would be required to decrease the pH of one liter of the growth medium from 6.0 to 3.0. In one aspect of the present invention, the growth medium is sufficiently poor in sugar as to have a buffer index below about 6. It may vary between 0.07 and 6.0, but is preferably below 3. Since the buffer action of the growth medium is relatively weak, the pH of the medium decreases rapidly due to the various acids being formed therein. When the pH has decreased to a value below about 3, then a sugar-rich, and preferably a molasses-containing solution is fed to the growth medium. The sugar thus introduced is converted to citric acid in high yield, a low pH being favorable to this conversion. Furthermore, we have found that where the pH is about or below 3 during fermentation in the present process, an excess of nutrient elements, including phosphorous, has less influence on efficiency of the conversion of sugar to citric acid than would be indicated from the prior art. Mycelium growth is impeded during the fermentation stage and mechanical difficulties resulting from an excess of mycelium are avoided. Accordingly, the sugar-rich solution added in the second period may without inconvenience contain nutrient elements.

However, growth of the mycelium to some extent during the second period cannot be completely avoided, and this factor limits the average concentration of acid product which can be reached at the end of the fermentation. This limit depends principally upon the content of nutrient elements in the molasses or sugar solution fed to the growth medium and the composition of the medium. However, for molasses of given composition and for a given final concentration of products in the resulting reaction medium, the citric acid yield is always substantially higher in the process of the present invention than in fermentations carried out in accordance with conventional processes.

The advantages of the present invention over a conventional single step fermentation process for the production of citric acid will be apparent from the following examples:

*Example 1*

A solution of beet molasses containing 390 grams of molasses per liter was brought to boiling and 2.8 grams per liter of potassium ferrocyanide were added thereto. The solution was then filtered, and employed as the stock solution.

To 9.6 liters of the stock molasses solution prepared as above described and diluted so as to contain 180 grams of molasses per liter, there was added per liter 0.030 gram of monopotassium phosphate and 0.3 gram of magnesium sulfate heptahydrate. The mixture was then sterilized and placed in a vessel fitted with a mechanical agitating device and a crown-shaped air injector. All parts of the apparatus in contact with the liquid were resistant to attack by acids formed during the process.

The sterilized liquid was seeded with spores of *Aspergillus niger* produced from a citric acid-producing stock cultivated on gelose. Sterile air saturated with water at 32° C. was blown through the liquid at a rate of 1000 liters per hour. The liquid was stirred and maintained at 32° C. throughout the process. The pH, which was initially 6.05, was found to be 3.05 on the fourth day of fermentation. The same day the free acids, reckoned as citric acid monohydrate, were titrated and the fermentation liquid was found to contain 31.5 grams per liter. Specific determination for citric acid itself showed only negligible amounts thereof. On the sixth day, no sugar was found in the liquid and the free acids figure was fixed at 46.2 grams per liter, reckoned as citric acid monohydrate. Specific determination for citric acid showed 13.1 grams per liter, i.e., 28% of the total acids. Citric acid yield amounted to 7.3% of the molasses, or 14.6% of the sugar used, the molasses containing about 50% sugar.

*Example 2*

From the above stock molasses solution there was prepared 6 liters of a sterilized solution containing per liter 50 grams of molasses, 0.050 gram of monopotassium phosphate and 0.5 gram of magnesium sulfate heptahydrate. This solution, which had a buffer index of 1.53 and an initial pH of 6.05, was placed in the apparatus of Example 1. The liquid was seeded with spores of *Aspergillus niger* produced from the same culture as those employed in Example 1. The liquid medium was agitated and air was blown therethrough at exactly the same rate as in Example 1. After 36 hours, the free acids figure was 9.1 grams per liter, reckoned as citric acid monohydrate, and the pH of the medium was 2.9.

At this point, the sterilized stock solution containing 390 grams molasses per liter and no added nutrient salts was fed to the medium. The rate of addition was adjusted so as to maintain the pH of the resulting medium in the range 2.5–2.9. There was so introduced 3.6 liters of this second solution over a period of 4 days. On the ninth day, no sugar was found in the mixture, and the free acids figure was fixed at 78 grams per liter, reckoned as citric acid monohydrate. Specific determination for citric acid showed 69.2 grams thereof per liter, i.e., 88.5% of the total acids. The citric acid yield amounted to 38.9% of the molasses or 77.8% of the sugar employed.

In both Examples 1 and 2, equivalent volumes of sugar solution were employed and the weight of sugar used was substantially the same, yet the method of the present invention as illustrated in Example 2 produced more than five times the amount of citric acid as the conventional one-step process of Example 1.

Example 2 is illustrative of the simplest method of carrying out this invention, but it should be understood that it is possible without departing from the scope of the invention to suppress or modify the addition of nutrient salts to the growth medium or to the solution to be fed thereto. While it is not necessary, it is possible to use molasses previously treated by any improving agent, including ion-exchange resins, calcium hydroxide, alkaline ferrocyanides or any other precipitating or complex-forming agent. It is also possible to use two or more kinds of molasses, or molasses having undergone different preliminary treatments for preparing both the growth medium and the solution to be fed thereto. Likewise, one may use molds other than *Aspergillus niger*, e. g., a selected stock of *Aspergillus wentii*, as well as strains of other citric acid producing molds. Furthermore, instead of beet molasses, sugar cane molasses, such as blackstrap molasses or the so-called "high-test molasses" may be used. While the present invention is directed primarily to the use of a cheap source of sugar, namely, molasses, it is also possible without departing from the scope thereof to prepare a growth medium and solution for adding thereto in the second period from a mixture of molasses and pure commercial sugar, which results in a solution having a substantially lower buffer index. It is also possible to operate with sugar only. It is also within the scope of the present invention to provide the growth medium with, or to add thereto during the growth period an acid which does not interfere with the biochemical reactions taking place. Citric acid is recommended for this purpose, and more particularly residual non-crystallizable citric acid mother liquors, usually available in citric acid plants, may be advantageously employed in the process at this point.

In the modification of the above described process, when the desired average concentration of products is reached toward the end of the second period and fermentation is ended or almost ended, it is possible, in accordance with the present invention, to withdraw part of the fermented liquid and to replace it during a third period by an equal volume of molasses solution of substantially the same average concentration as the medium in the second period. During this replacement, the pH of the fermented medium is maintained at about or below 3, as described above in connection with addition during the second period. The withdrawal of fermented liquid and addition of the replacement molasses solution may be effected continuously, or repeated batchwise. The time of continuous addition or the number of batchwise additions depends upon the rate of growth of mycelium during this period. They will thus depend upon the strength of stirring, the kind of molasses used, and primarily upon its content of nutrient elements. The content of nutrient elements of course determines the weight of mycelium which is obtained when fermentation is completed and equilibrium is reached. With certain molasses too poor in nutrient elements, it may be necessary to add such elements. Conversely, in some cases, it may be advisable to use for the feed during the third period a mixture of molasses and commercial sugar.

This modification has far-reaching commercial possibilities, since during the third period substantially all of the sugar introduced is converted, yielding a high percentage of citric acid. This high yield substantially increases the average yield of the total operation, and results in improved productivity of the fermentation plant.

This is illustrated by the following example:

*Example 3*

To 6 liters of the stock molasses solution prepared as above described and diluted so as to contain 70 grams of molasses per liter, there was added per liter 0.050 gram of monopotassium phosphate and 0.5 gram of magnesium sulfate heptahydrate. This solution, which had a buffer index of 2.1 and an initial pH of 6.05, was seeded and aerated as described in Example 2.

After 36 hours, the free acids figure was 12 grams per liter, reckoned as citric acid monohydrate, and the pH was 2.9. At this point, stock molasses solution diluted so as to contain 376 grams molasses per liter and no added nutrient salts was fed to the medium, at a rate adjusted so as to maintain the pH of the resulting medium in the range 2.6–2.9. There was so introduced 3 liters of this second solution over a period of 3 days. On the seventh day, no sugar was found in the mixture, and the free acids figure was fixed at 73 grams per liter, reckoned as citric acid monohydrate. Specific determination for citric acid showed 60 grams thereof per liter, i.e., 82% of the total acids. The citric acid yield at this stage amounted to 69.7% of the sugar employed.

Then we withdrew each day, for a period of 3 days, one liter of fermented mixture and we replaced it by one liter of sterilized stock molasses solution diluted so as to contain 172 grams molasses per liter and to which there had been added 0.030 gram of monopotassium phosphate per liter. The pH was maintained in the range 2.6–2.9. On the tenth day, the apparatus was drained off and there was obtained 9 liters of fermented mixture. The free acids figure was fixed at 80 grams per liter, reckoned as citric acid monohydrate. Specific determination for citric acid showed 73 grams thereof per liter, i.e., 91% of the total acids. On the other hand, the three liters withdrawn during the third stage contained a global proportion of free acids of 74 grams per liter, reckoned as citric acid monohydrate, specific determination for citric acid showing 64 grams thereof per liter, i.e., 86% of the total acids.

The total citric acid yield thus amounted to 82% of the sugar employed.

We claim:

1. A process for producing citric acid by aerobic fermentation, which comprises providing a growing medium comprising a solution containing sugar and mold nutrient elements, said solution having a buffer index below about 6, growing mycelium of a citric acid-producing mold in said medium, allowing the pH of said medium to decrease during growing to below about 3, then adding to said medium a solution of molasses containing buffer substances, said molasses solution being substantially richer in sugar than the original growing medium, at a rate such that the pH of the resulting medium is maintained below about 3, whereby substantial growth of said mycelium is avoided, allowing fermentation of said sugar to citric acid to proceed substantially to completion, separating fermented liquid from the mycelium, and recovering citric acid from said liquid.

2. A process according to claim 1 wherein the growing medium contains also added citric acid.

3. A process according to claim 2 wherein the citric acid is in the form of non-crystallizable citric acid mother liquor.

4. A process according to claim 1 wherein the citric acid-producing mold is selected from the group consisting of *Aspergillus niger* and *Aspergillus wentii*.

5. A process according to claim 1 wherein the molasses solution added to the growing medium contains nutrient elements.

6. A process according to claim 1 wherein the sugar in said growing medium is selected from the group consisting of molasses, commercial sugar and mixtures thereof.

7. A process as set forth in claim 1 wherein the pH of the resulting medium during the addition of the molasses solution to the growing medium is in the range 2.5 to 2.9.

8. A process for producing citric acid by aerobic fermentation which comprises providing a sterilized growing medium comprising a crude molasses solution sufficiently poor in sugar as to have a buffer index between about 0.07 and 6, growing mycelium of citric acid-producing mold in said medium in the presence of nutrient elements while allowing the pH of said medium to decrease during growing to below about 3, then adding thereto a molasses solution containing buffer substances and substantially richer in sugar than said growing medium, at a rate such that the pH of the resulting medium is maintained below about 3, allowing fermentation of the sugar to citric acid to proceed, subsequently separating fermented liquid from the mycelium, and recovering citric acid from said liquid.

9. A process according to claim 8 wherein the buffer index of the growing medium prior to the growth of mycelium is between 0.07 and 3.

10. A process according to claim 8 wherein the pH of the resulting medium during addition of the molasses solution to the growing medium is in the range 2.5 to 2.9.

11. A process for producing citric acid by aerobic fermentation which comprises providing in a reaction vessel a growing medium containing nutrient elements and a sugar solution containing at least one member from the group consisting of molasses and commercial sugar and being sufficiently poor in sugar as to have a buffer index between about 0.07 and 6, growing mycelium of citric acid-producing mold in said medium while allowing the pH of said medium to decrease to below about 3, then adding thereto a solution of molasses containing buffer substances, said molasses solution being substantially richer in sugar than the original growing medium, at a rate such that the pH of the resulting medium is maintained below 3, allowing fermentation of the sugar to citric acid to proceed substantially to completion, withdrawing a portion of the fermented liquid from said vessel, replacing said withdrawn portion with a substantially equal volume of a solution of molasses with a sugar concentration substantially the same as the average sugar concentration of the medium during the fermentation period, the rate of replacement being such that the pH of the liquid in the vessel does not rise above 3, allowing fermentation of the last added molasses solution to citric acid to continue, whereby substantially all of the sugar in said last solution is converted to citric acid, withdrawing additional fermented liquid and replacing the same with a substantially equal volume of molasses solution substantially the same as said last molasses solution as aforesaid, and subsequently recovering citric acid from the liquids so withdrawn.

12. A process according to claim 11 wherein the withdrawals of fermented liquid from the reaction vessel and the replacements of sugar thereto are effected continuously.

13. A process according to claim 11 wherein at least one of the replacing molasses solutions contains nutrient elements.

References Cited in the file of this patent

UNITED STATES PATENTS

| | | |
|---|---|---|
| 1,679,186 | Szucs | July 31, 1928 |
| 1,691,965 | Fernbach | Nov. 20, 1928 |
| 1,691,966 | Fernbach | Nov. 20, 1928 |
| 2,353,771 | Szucs | July 18, 1944 |
| 2,394,031 | Waksman et al. | Feb. 5, 1946 |
| 2,438,136 | Szucs | Mar. 23, 1948 |

OTHER REFERENCES

"Industrial Fermentation," by Underkofler et al., 1954, vol. 1, pub. by Chemical Publishing Co., Inc. (N.Y.), pp. 431 and 432.